(12) United States Patent
Ökvist et al.

(10) Patent No.: US 11,350,322 B2
(45) Date of Patent: May 31, 2022

(54) ALTITUDE DEPENDENT MEASUREMENT REPORTING

(71) Applicant: Telefonaktiebolaget LM Ericsson (publ), Stockholm (SE)

(72) Inventors: Peter Ökvist, Luleå (SE); Tommy Arngren, Södra Sunderbyn (SE); Stefan Wänstedt, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/970,008

(22) PCT Filed: Jul. 3, 2018

(86) PCT No.: PCT/SE2018/050729
§ 371 (c)(1),
(2) Date: Aug. 14, 2020

(87) PCT Pub. No.: WO2019/160460
PCT Pub. Date: Aug. 22, 2019

(65) Prior Publication Data
US 2020/0413303 A1   Dec. 31, 2020

Related U.S. Application Data

(60) Provisional application No. 62/630,965, filed on Feb. 15, 2018.

(51) Int. Cl.
*H04W 24/10* (2009.01)
*H04W 36/00* (2009.01)
*H04W 36/04* (2009.01)
*H04W 84/12* (2009.01)
*H04W 88/02* (2009.01)

(52) U.S. Cl.
CPC ....... *H04W 36/0058* (2018.08); *H04W 24/10* (2013.01); *H04W 36/0061* (2013.01); *H04W 36/04* (2013.01); *H04W 84/12* (2013.01); *H04W 88/02* (2013.01)

(58) Field of Classification Search
CPC ............. H04W 36/0058; H04W 24/10; H04W 36/0061; H04W 36/04; H04W 84/12; H04W 88/02; H04W 36/0094; H04W 36/00837; H04B 7/18502
See application file for complete search history.

(56) References Cited

U.S. PATENT DOCUMENTS

2018/0220406 A1* 8/2018 Mizusawa ........... H04W 72/046
2019/0180633 A1* 6/2019 Yoshizawa .............. B64C 39/02

OTHER PUBLICATIONS

ETSI TS 136 331 V13.0.0 (Jan. 2016) (Year: 2016).*
International Search Report dated Dec. 9, 2018 for International Application No. PCT/SE2018/050729 filed on Jul. 3, 2018 consisting of 13-pages.

(Continued)

*Primary Examiner* — Chuong A Ngo
(74) *Attorney, Agent, or Firm* — Christopher & Weisberg, P.A.

(57) ABSTRACT

In embodiments disclosed herein, the measurement and reporting procedures associated with RRCConnectionReconfiguration or RRCConnectionResume message consider node altitude (e.g., UE altitude and/or base station altitude).

12 Claims, 9 Drawing Sheets

400 s402: Determine that a measurement report should be transmitted, wherein determining that the measurement report should be transmitted comprises determining that a condition is satisfied, wherein determining that the condition is satisfied comprises calculating a first value using at least a second value and a third value as inputs to the calculation, wherein at least one of the second value and the third value is dependent on an altitude of one of the UE and a base station s404: transmit the measurement report

(56) References Cited

OTHER PUBLICATIONS

3GPP TSG-RAN WG2 Meeting #100 R2-1712992; Title: Discussion on Measurement for Aerial Vehicles Handover; Agenda Item: 9.4.4; Source: Sony; Document for: Discussion and decision; Date and Location: Nov. 27-Dec. 1, 2017; Reno, USA; consisting of 4-pages.
3GPP TS 36331 V15.0.1; 3rd Generation Partnership Project; Technical Specification Group Radio Access Network; Evolved Universal Terrestrial Radio Access (E-UTRA); Radio Resource Control (RRC); Protocol Specification (Release 15); Jan. 2018, consisting of 776-pages.
3GPP TSG-RAN WG2 #100 R2-1713265; Title: Mobility Enhancements for UAVs—reference altitude; Agenda Item: 9.4.4.3; Source: Nokia, Nokia Shanghai Bell; WID/SID: FS LTE Aerial—Release 15; Document for: Discussion and decision; Date and Location: Nov. 27-Dec. 1, 2017, Reno, USA.
3GPP TSG-RAN WG2 Meeting #100 R2-1713314; Title: Discussion for Status Management for Aerial UE; Agenda Item: 9.4.4.3; Source: Lenova, Motorola Mobility; Document for: Discussion and decision; Date and Location: Nov. 27-Dec. 1, 2017, Reno, USA.
3GPP TSG-RAN WG2 Meeting #100 R2-1713451 Title: Summary on [99b#61 [ [LTE/UAV] Identify Potential Solutions on Mobility Enhancement; Agenda Item: 9.4.4.3; Source: Ericsson (Rapporteur); Document for: Discussion and decision; Date and Location: Nov. 27-Dec. 1, 2017, Reno, USA.

* cited by examiner

ALTITUDE DEPENDENT MEASUREMENT REPORTING

CROSS-REFERENCE TO RELATED APPLICATIONS

This application is a Submission Under 35 U.S.C. § 371 for U.S. National Stage Patent Application of International Application No.: PCT/SE2018/050729, filed Jul. 3, 2018 entitled "ALTITUDE DEPENDENT MEASUREMENT REPORTING," which claims priority to U.S. Provisional Application No. 62/630,965, filed Feb. 15, 2018, the entireties of both of which are incorporated herein by reference.

TECHNICAL FIELD

Disclosed are embodiments related to measurement reporting.

BACKGROUND

A user equipment (UE) typically reports measurement information in accordance with a measurement configuration provided by the network (e.g., an E-UTRAN). An E-UTRAN provides the measurement configuration applicable for a UE in RRC_CONNECTED state by using dedicated signaling, i.e., using the RRCConnectionReconfiguration or RRCConnectionResume message (see 3GPP TS 36.331 (v. e40), section 5.5 Measurements). As used herein, a UE is a wireless communication device (e.g., a smartphone, a laptop, a tablet, a smart sensor, an Internet-of-Things (IoT) device, etc.). that is capable of wireless communication with a base station (BS) (e.g., a 3GPP BS such as eNB or gNB, a Wi-Fi access point, etc.)).

The UE can be requested to perform the following types of measurements: (1) Intra-frequency measurements—measurements at the downlink carrier frequency(ies) of the serving cell(s); (2) Inter-frequency measurements—measurements at frequencies that differ from any of the downlink carrier frequency(ies) of the serving cell(s); (3) Inter-RAT measurements of UTRA frequencies; (4) Inter-RAT measurements of GERAN frequencies; (4) Inter-RAT measurements of CDMA2000 HRPD or CDMA2000 1×RTT or WLAN frequencies; and (5) CBR measurements.

A measurement configuration may include the following parameters: (1) measurement objects, (2) a list of reporting configurations, (3) a list of measurement identities, (4) quantity configurations, and (5) measurement gaps.

Measurement Objects:

Measurement objects are the objects on which the UE shall perform the measurements. For intra-frequency and inter-frequency measurements, a measurement object is a single E-UTRA carrier frequency. Associated with this carrier frequency, E-UTRAN can configure a list of cell specific offsets, a list of 'blacklisted' cells and a list of 'whitelisted' cells Blacklisted cells are not considered in event evaluation or measurement reporting. For inter-RAT UTRA measurements, a measurement object is a set of cells on a single UTRA carrier frequency. For inter-RAT GERAN measurements a measurement object is a set of GERAN carrier frequencies. For inter-RAT CDMA2000 measurements, a measurement object is a set of cells on a single (HRPD or 1×RTT) carrier frequency. For inter-RAT WLAN measurements, a measurement object is a set of WLAN identifiers and optionally a set of WLAN frequencies. For CBR measurements, a measurement object is a set of transmission resource pools for V2X sidelink communication.

A List of Reporting Configurations:

Each reporting configuration in the list consists of the following: 1) reporting criterion—the criterion that triggers the UE to send a measurement report (this can either be periodical or a single event description); and 2) reporting format—the quantities that the UE includes in the measurement report and associated information (e.g. number of cells to report).

A list of Measurement Identities:

Each measurement identity in the list links one measurement object with one reporting configuration. By configuring multiple measurement identities it is possible to link more than one measurement object to the same reporting configuration, as well as to link more than one reporting configuration to the same measurement object. The measurement identity is used as a reference number in the measurement report.

Quantity Configurations:

One quantity configuration is configured per RAT type. The quantity configuration defines the measurement quantities and associated filtering used for all event evaluation and related reporting of that measurement type. One filter can be configured per measurement quantity.

Measurement Gaps:

A measurement gap is a period that the UE may use to perform measurements, i.e. no (UL, DL) transmissions are scheduled.

Measurement procedures distinguish between the following types of cells: Serving cell(s), Listed cells and Detected cells.

For applicable measurements, the UE applies layer 3 filtering as specified in 3GPP TS 36.331 (v 14.4.0) section 5.5.3.2, before using the measured results for evaluation of reporting criteria or for measurement reporting.

In brief, for each applicable measurement quantity that the UE performs measurements, the measured result is filtered before using for evaluation of reporting criteria or for measurement reporting, according to:

$$F_n = (1-a) \cdot F_{n-1} + a \cdot M_n, \text{ where:}$$

$M_n$ is the latest received measurement result from the physical layer;

$F_n$ is the updated filtered measurement result, that is used for evaluation of reporting criteria or for measurement reporting;

$F_{n-1}$ is the old filtered measurement result, where $F_0$ is set to $M_1$ when the first measurement result from the physical layer is received;

$a = \frac{1}{2}^{(k/4)}$, where k is the filterCoefficient for the corresponding measurement quantity received by the quantityConfig.

In context of cell handover and ANR NRT operations, Event A3 (Neighbour becomes offset better than PCell/PSCell, see 3GPP TS 36.331, section 5.5.4.4.) is considered. In brief, the Event A3 is triggered when a neighboring cell becomes better than the serving cell by a specified offset that can be either positive or negative. According to 3GPP technical specification, the UE shall consider the entering condition for this event to be satisfied when the "Entering" condition is satisfied and the UE shall consider the leaving condition for this event to be satisfied when the "Leaving" condition is satisfied. The "Entering" condition is defined as:

$$Mn + Ofn + Ocn - Hys > Mp + Ofp + Ocp + Off, \text{ and}$$

the Leaving condition is defined as:

$$Mn + Ofn + Ocn + Hys < Mp + Ofp + Ocp + Off, \text{ where}$$

Mn is the measurement result of the neighbouring cell
Ofn is the frequency specific offset of the frequency of the neighbour cell (offsetFreq).
Ocn is the cell specific offset of the neighbour cell (cellIndividualOffset).
Mp is the measurement result of the PCell/PSCell.
Ofp is the frequency specific offset of the frequency of the PCell/PSCell (offsetFreq).
Ocp is the cell specific offset of the PCell/PSCell (cellIndividualOffset).
Hys is the hysteresis parameter for this event.
Off is the offset parameter for this event (a3-Offset).
Mn, Mp are expressed in dBm in case of RSRP, or in dB in case of RSRQ and RS-SINR, and
Ofn, Ocn, Ofp, Ocp, Hys, Off are expressed in dB.

FIG. 1 illustrates the event A3 Entering and Leaving conditions.

Parameters above mentioned related to the Event A3, such as hysteresis, cell specific offset (cellIndividualOffset), a3-Offset, timeToTrigger and parameters associated with the above illustrated layer 3 filtering such as e.g. reporting intervals and k filter coefficient are derived based on today's radio network use cases and corresponding radio environment conditions such as shadow fading and typical UE speeds. Typical UE speeds are hereto considered more or less uniquely in the plane (i.e. not in the vertical direction).

characteristics such as blocking or partial blocking from buildings, ground level topology and foliage are critical factors.

As a consequence, the practical shadow fading and blocking environment, and to what extent that contributes to which cells see a neighboring cell, will of course differ depending on if you are low down on the ground or slightly above rooftops or airborne completely away from building shadowing.

In a scenario where an airborne UE goes over rooftops, other cell relations will be detected than typically identified had the UE been on ground level. The higher the altitude, the more different will an efficient neighbor cell relation list be from a set of optimal cell relations. More specifically, the altitude of a device should contribute to what NRT that is considered for that specific device.

An improved ANR mechanism that takes UEs altitude into consideration is proposed. In brief, the suggested solution is to use altitude information in NRT to distinguish beneficial cell relations for UEs (UAVs) operating at different altitudes. That would enable more efficient utilization of radio network resources as more relevant cells are considered for UE's handover.

In practice, one preferred enablement is to update the corresponding NRT with entries reflecting certain UE altitudes. As a UE detects a new cell, given that the network knows the UE's current heights, the network can select how to handle corresponding cell relations efficiently; further exemplified in in Table 1 below.

TABLE 1

NRT with UE altitude entries; table entity 'UE altitude: ground level' represents today's approach of not resolving cell relations with respect to UE height)

| NR | TCI | UE altitude: ground level | | | UE altitude: intermediate | | | UE altitude: high | | |
|----|-----|---------------------------|--|--|---------------------------|--|--|--------------------|--|--|
| | | No remove | No HO | No X2 | No remove | No HO | No X2 | No remove | No HO | No X2 |
| 1 | TCI#1 | | | | | x | | | x | x |
| 2 | TCI#1 | x | | x | | x | x | | x | X |
| 3 | TCI#1 | x | | | | x | x | | | |

Automatic Neighbor Relation (ANR)

The purpose of the ANR function is to relieve the network operator from the burden of manually managing neighbor relations (NRs). An ANR function resides in the eNBs and manages the conceptual Neighbor Relation Table (NRT).

Located within ANR, the Neighbor Detection Function finds new neighbors and adds them to the NRT. ANR also contains the Neighbor Removal Function which removes outdated NRs. The Neighbor Detection Function and the Neighbor Removal Function are implementation specific. Presumably also for New Radio (NR), ANR will be used as a tool to automatically optimize handover performance. An ANR procedure is further illustrated in FIG. 2, which shows a UE detecting a new cell (i.e., the "Detected eNB").

In 3GPP TS 36.300 v14.1.0 (2016-12), section 22.3.2a Automatic Neighbor Relation Function, the ANR functionality, describes what actions that should be allowed/permitted when a UE moves/handovers between a set of cells.

SUMMARY

Today, typical UEs are most commonly used on ground (street) level. Neighbor cell relations, e.g. such as to block handover, etc., will be a function of the radio environment in which the UE operates. In that context, shadow fading This would typically enable that, e.g., an UAV above rooftops can follow better optimized HO rules given the radio propagation environment at its operational altitude.

In today's proposed state of the art solutions Table 1 is further updated with corresponding NRTs entries reflecting certain altitudes of the source and target eNBs. As a UE detects a new cell, given that the network knows UE's current altitude, and that the network also know the current altitude of own cell and its target cells, the network can select how to handle corresponding cell relations efficiently.

Accordingly, given that more and more UEs and base stations are becoming airborne, radio resource management functionalities, and the plethora of parameters and filtering settings, should be updated to cope with these new radio environment conditions that emerge from that fact that UEs and/or base stations are operating at time-varying altitudes.

For example, in today's tuning of the handover-related RRC measurement report Event A3, hysteresis, cell individual offsets and Event offsets are not considering that radio nodes can operate in significantly different radio environments over time. One typical example is that eNBs operating at different altitudes will perceive different path loss and different shadow fading. For instance, eNBs operating at ground level may perceive significantly different propagation and shadow fading environments than eNBs operating at a relatively high altitude (e.g., above rooftops and/or foliage). Thus, the impact from that radio environment characteristics are significantly different at different altitudes in the network are not considered in today's e.g. Event A3 and layer 3 filtering parameter settings.

Accordingly, in embodiments disclosed herein, the measurement and reporting procedures associated with RRCConnectionReconfiguration or RRCConnectionResume message (3GPP TS 36.331, section 5.5ff), consider node altitude (e.g., UE altitude and/or base station altitude). For example, the RSRP layer 3 filtering parameter is modified to reflect a less aggressive setting as UE and its related eNB are operating above rooftops (altitude: high). As another example, Event A3 cell-individual offset and a3-offset are made smaller to avoid that UAV-UE reach too far into an already wide spread target cell. An advantage of the embodiments disclosed herein is that they enable more efficient utilization of radio network resources as more relevant feature parameters, hysteresis and filter settings area applied reflecting flight altitude of individual network nodes.

In one embodiment there is provided a reporting method performed by a user UE. The method includes the UE determining that a measurement report should be transmitted and the UE, as a result of determining that a measurement report should be transmitted, transmitting the measurement report. Advantageously, determining that the measurement report should be transmitted comprises determining that a condition associated with a reporting event is satisfied, determining that the condition associated with the reporting event is satisfied comprises calculating a first value using at least a second value and a third value as inputs to the calculation, and at least one of the second value and the third value is dependent on an altitude of one of the UE and a base station.

In some embodiments, calculating the first value using at least a second value and a third value comprises calculating: $X=(Fn+Ofn+Ocn-Hys)$, where Fn is a filtered measurement value based on a measurement of a signal transmitted by a neighbor BS, Hys is a hysteresis value, Ofn is a frequency specific offset, and Ocn is a cell specific offset. At least one of Hys, Ofn, and Ocn is dependent on the altitude of the neighbor BS. In such an embodiments, determining that the condition associated with the reporting event is satisfied further may further include calculating: $Y=(Fp+Ofp+Ocp+Off)$ and determining whether the X is greater than Y, wherein Fp is a second filtered measurement value, wherein the second filtered measurement value is based on a measurement of a signal transmitted by a serving BS, Ofp is dependent on the altitude of the serving BS, and Ocp is dependent on the altitude of the serving BS. In such an embodiment, the method may further include calculating $Fn=(1-a) \times Fn-1+a \times Mn$, where $a=\frac{1}{2}^{(k/4)}$, k is a filter coefficient, wherein k is dependent on the altitude of the UE and/or the altitude of the serving base station, Fn-1 is a previous filtered measurement, and Mn is a measurement value.

In some embodiments, the method further includes, prior to determining that a measurement report should be transmitted, the UE receiving from the serving base station a message comprising a measurement information element (IE), wherein the measurement IE comprises a set of offsets (e.g., a set of frequency specific offsets, a set of cell specific offsets) wherein each offset in the set of offsets is associated with a different altitude. In such an embodiment, the second value may be selected from said set of offsets based on a determined altitude of the base station.

In another embodiment there is provided a reporting method performed by a base station. The method includes the base station transmitting to a UE a message comprising a measurement information element (IE), wherein the measurement IE comprises a first set of offsets (e.g., a set of frequency specific offsets) wherein each offset in the first set of offsets is associated with a different altitude. The method also includes receiving a measurement report transmitted by the UE. In some embodiments, the measurement IE further comprises a second set of offsets (e.g., a set of cell specific offsets), wherein each offset in the second set of offsets is associated with a different altitude.

BRIEF DESCRIPTION OF THE DRAWINGS

The accompanying drawings, which are incorporated herein and form part of the specification, illustrate various embodiments.

DETAILED DESCRIPTION

Figure 1:
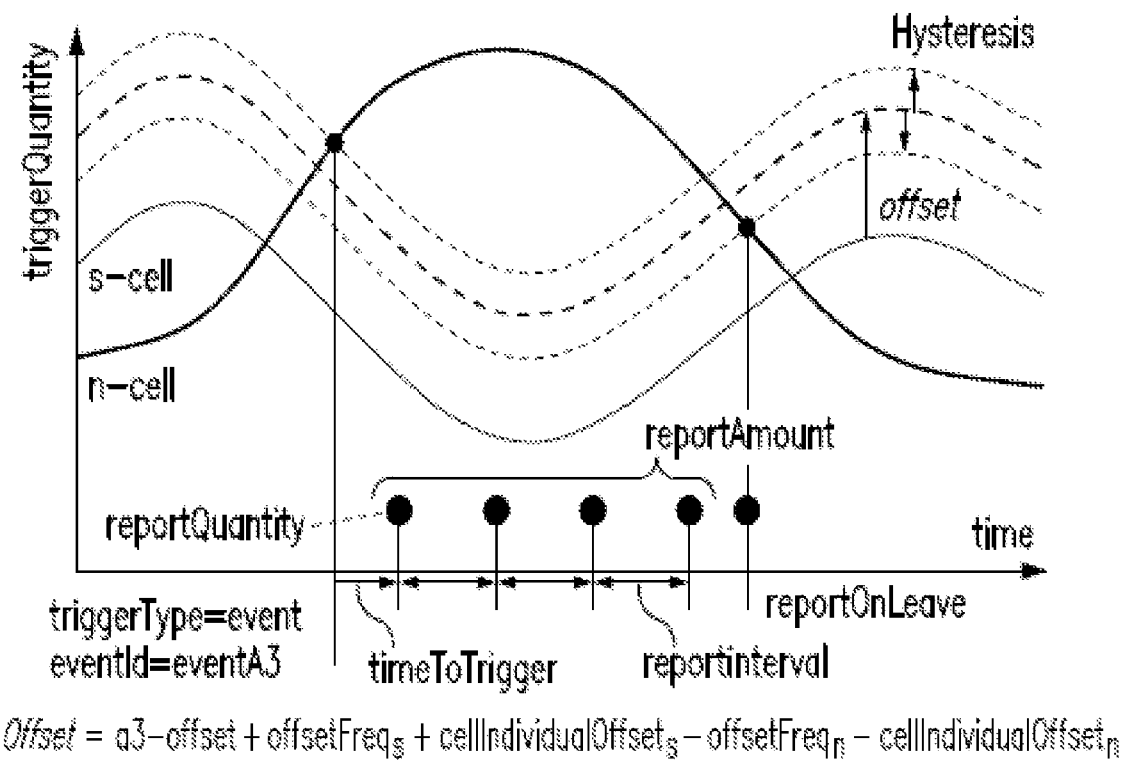
FIG. 1 illustrates Event A3 Entering and Leaving conditions.
Figure 2:
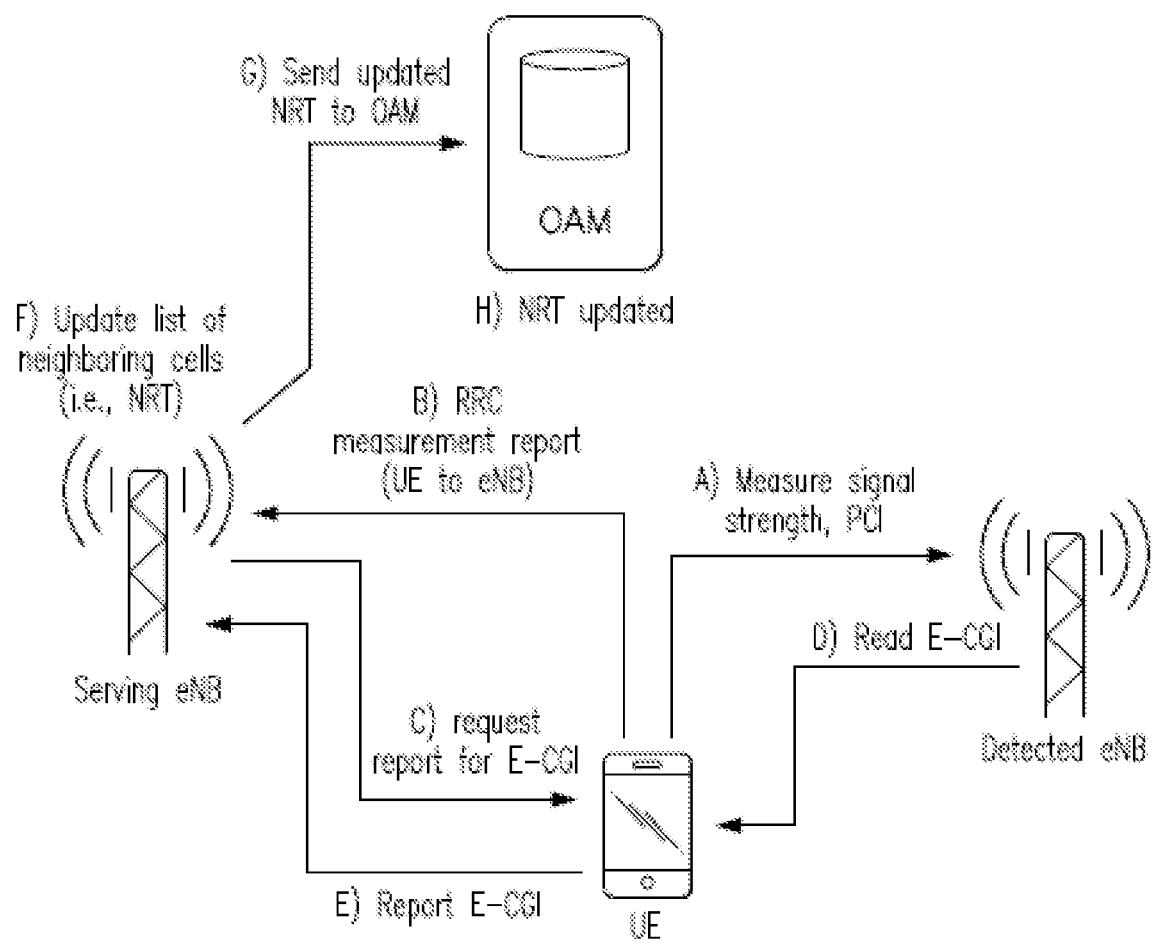
FIG. 2 illustrates an ANR procedure.
Figure 3:
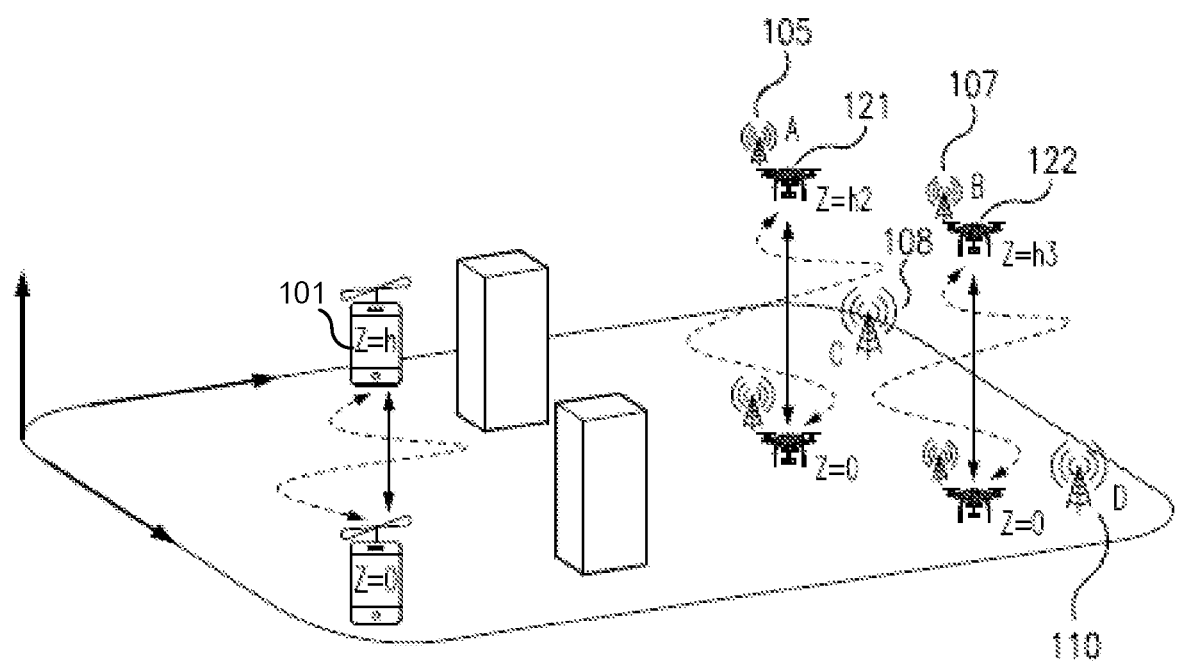
FIG. 3 illustrates a radio network according to some embodiments.

FIG. 3 illustrates a network 300 according to an exemplary embodiment. Network 300 includes the following network nodes: a UE 101, a first BS 105, which may be connected to (or located inside of) an unmanned aerial vehicle (UAV) 121, a second BS 107, which may be connected to (or located inside of) UAV 122, a first ground-based BS 108, and a second ground-based BS 110. As shown in FIG. 3, UE 101, BS 105 and BS 107 can each move in all three dimensions. Thus, each node may have a time-varying altitude.

Advantageously, in some embodiments, as UE 101 moves in the spatial domain (i.e. x, y, z) it detects/monitors changed cell relations using i) parameters (e.g., offsets) that reflect the altitude of the individual BSs and ii) filter settings that reflect its own altitude.

There are a number of different use cases possible. One example is an event in a remote location (remote in the radio sense of having limited coverage/capacity) where a large number of people are expected (during a limited period of time). At the start of the event coverage may be supplied by stationary BSs (e.g., eNBs, gNBs) at a distance. As more users arrive at the location one or more non-stationary BSs can be deployed at a fairly high altitude to provide capacity for the location. The non-stationary BSs can use existing spectrum for backhauling although other possibilities in practice exist. At some point there will be even more users, and thus, there will be need for more BSs. The extra capacity can be provided by launching more non-stationary BSs but moving all of them to a lower altitude.

Another similar use case, but with even more movement, is a large-scale evacuation of people, e.g. in connection to storms like the one in Florida in year 2017. In such a scenario, there may be many people in "remote" areas that move slowly due to congested roads. It is likely that the network is not built for such extreme capacity needs and/or the network may be damaged by the storm.

Figure 4:
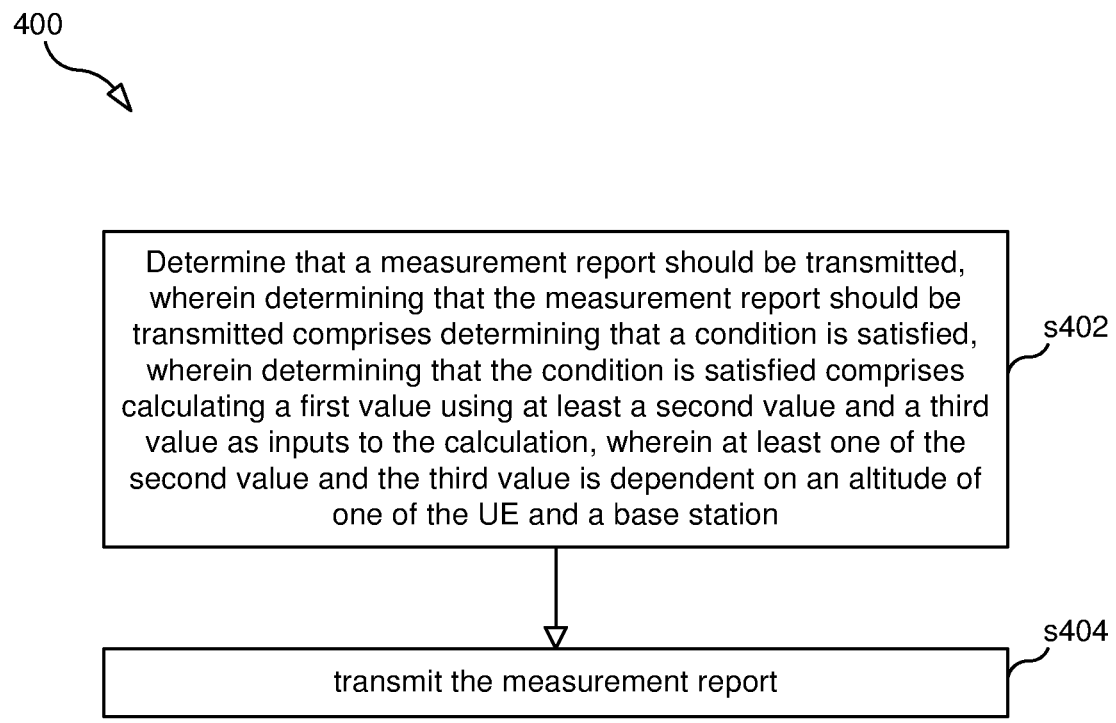
FIG. 4 is a flow chart illustrating a process according to one embodiment.

FIG. 4 is a flow chart illustrating a reporting process 400, according to some embodiments, that is performed by UE 101. Process 400 may begin with step s402, in which UE 101 determines that a measurement report should be transmitted (e.g., transmitted to a BS that is serving UE 101, which in this example is BS 105). Determining that the measurement report should be transmitted comprises determining that a condition associated with a reporting event is satisfied. The reporting event may be any one of the events defined in 3GPP TS 36.331 14.4.0 section 5.5.4, such as, for example, Event A3. For instance, determining that the measurement report should be transmitted comprises determining that the entering or leaving condition associated with the event is satisfied. Determining that the condition associated with the reporting event is satisfied comprises calculating a first value using at least a second value (e.g., a filtered measurement, an offset value, hysteresis value, etc.) and a third value (e.g., a filtered measurement, an offset value, hysteresis value, etc.) as inputs to the calculation, wherein at least one of the second value and the third value is dependent on an altitude of one of the UE and a base station.

For example, as part of step s402, UE 101 may calculate: X (i.e., the first value) =(Fn+Ofn+Ocn−Hys) and also calculate Y=(Fp+Ofp+Ocp+Off), and then may compare X and Y to determine whether X is greater than Y. As described in the background section Fn is equal to:
$(1-a) \times Fn-1 + a \times Mn$, where $a=\frac{1}{2}^{(k/4)}$, where k is a filter coefficient. In embodiments disclosed herein, k is dependent on UE 101's altitude and/or BS 105's altitude. Additionally, at least one of Ofn, Ocn, and Hys is dependent on the altitude of the detected neighboring BS. Also, at least one of Ofp, Ocp, and Off is dependent on the altitude of BS 105. Likewise, the filter coefficient, k, that is used to calculate Fp is dependent on the BS 105' altitude.

In step s404, as a result of determining that the measurement report should be transmitted, UE 101 transmits the measurement report to BS 105.

As noted above, all events related to RRC Measurement Report Triggering as listed in 3GPP 36.331 are subject to update with respect to involved nodes operational altitudes as in detail exemplified in the above examples. In each Event case, entities such as, i.e. specific hysteresis and thresholds, signal strength offsets for targeting or source cells, etc. may be altitude dependent.

Figure 5:
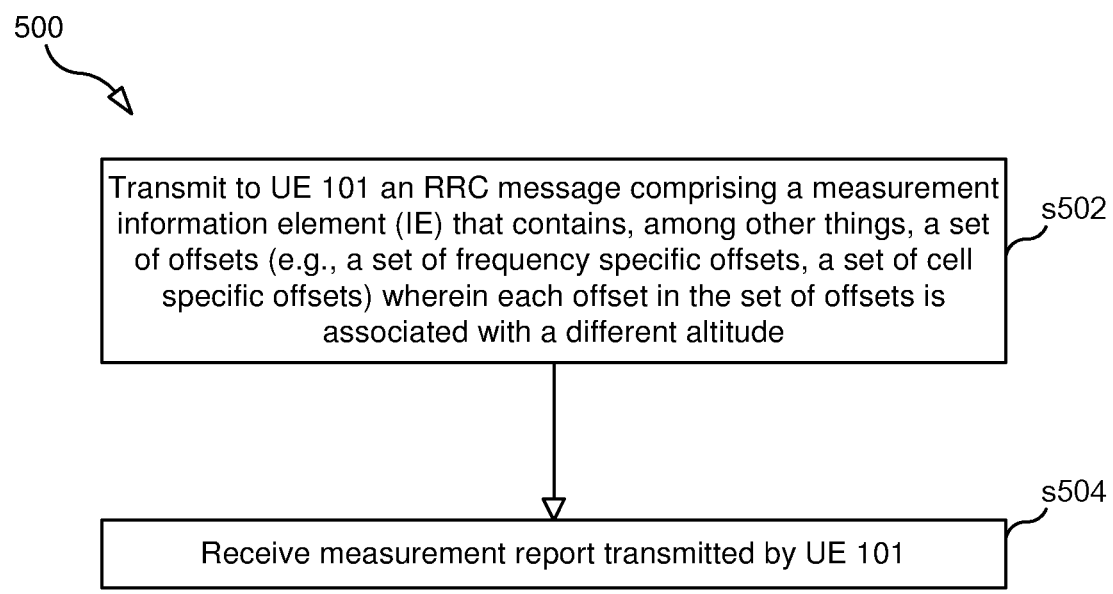
FIG. 5 is a flow chart illustrating a process according to one embodiment.

FIG. 5 is a flow chart illustrating a measurement reporting process 500, according to some embodiments, that is performed by, for example, BS 105. Process 500 may begin with step s502, in which BS 105 transmits to UE 101 an RRC message comprising a measurement information element (IE) that contains, among other things, a set of offsets (e.g., a set of frequency specific offsets, a set of cell specific offsets) wherein each offset in the set of offsets is associated with a different altitude. For example, the measurement IE may contain, among other things, a set of three cell specific offsets for the neighbor (Ocn1, Ocn2, Ocn3), wherein offset Ocn1 is associated with "low" altitude (e.g., any altitude below X meters); offset Ocn2 is associated with "medium" altitude (e.g., any altitude above X meters but below Y meters (Y>X); and offset Ocn3 is associated with "high" altitude (e.g., any altitude above Y meters). Likewise, the measurement IE may also contain, among other things, a set of three frequency specific offsets for the neighbor (Ofn1, Ofn2, Ofn3), wherein such offset is associated with a different altitude. In a similar manner, the measurement IE may also contain a set of cell specific offsets for the PCell/PScell and a set of frequency specific offsets for the PCell/PScell.

In step s504, BS 105 receives a measurement report transmitted by UE 101.

As explained above, UE 101 may use one of the frequency specific offsets for the neighbor and one of the cell specific offsets for the neighbor in a process for determining whether UE 101 should send a measurement report to BS 105. For example, in determining whether the entering condition for Event A3 is satisfied, UE 101 may determine the altitude of the detected neighboring BS and then based on this determined altitude select from the set of cell specific offsets for the neighbor the cell specific offset that corresponds to the determined altitude. Specifically, for example, if UE 101 determines that the altitude of the neighboring BS is above Y meters, then UE 101 will use Ocn3 and Ofn3 to determine whether the entering condition for Even A3 is satisfied—i.e., UE 101 will calculate X=(Fn+Ofn3+Ocn3−Hys). Likewise, Y=(Fp+Ofp3+Ocp3+Off3), where Ofp3, Ocp3, Off3 where offsets that are selected by UE 101 based on the altitude of BS 105.

Figure 6:
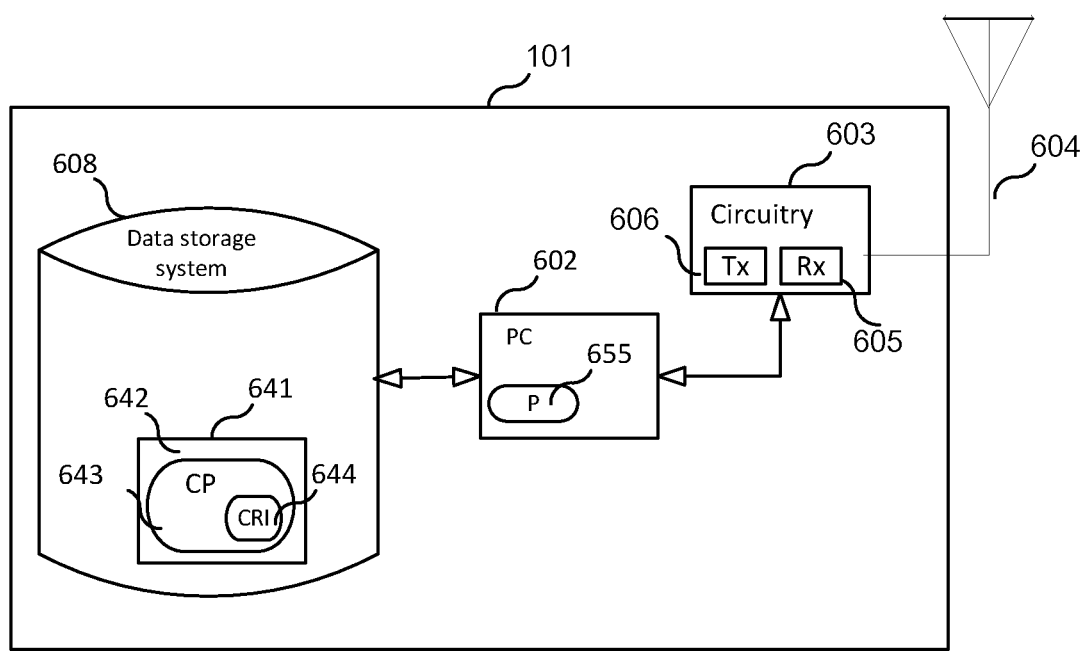
FIG. 6 is a block diagram of a UE according to one embodiment.

FIG. 6 is a block diagram of UE 101 according to some embodiments. As shown in FIG. 6, UE may comprise: processing circuitry (PC) 602, which may include one or more processors (P) 655 (e.g., a general purpose microprocessor and/or one or more other processors, such as an application specific integrated circuit (ASIC), field-programmable gate arrays (FPGAs), and the like); circuitry 603 (e.g., radio transceiver circuitry comprising an Rx 605 and a Tx 606) coupled to an antenna system 604 for wireless communication with other UEs and/or base stations, such as 3GPP base stations or other base stations); and local storage unit (a.k.a., "data storage system") 608, which may include one or more non-volatile storage devices and/or one or more volatile storage devices (e.g., random access memory (RAM)). In embodiments where DPA 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, but not limited, to magnetic media (e.g., a hard disk), optical media, memory devices (e.g., random access memory, flash memory), and the like. In some embodiments, the CRI 644 of computer program 643 is configured such that when executed by data processing apparatus 602, the CRI causes UE to perform steps described herein (e.g., steps described herein with reference to the flow charts and/or message flow diagrams). In other embodiments, UE may be configured to perform steps described herein without the need for code. That is, for example, DPA 602 may consist merely of one or more ASICs. Hence, the features of the embodiments described herein may be implemented in hardware and/or software.

Figure 7:
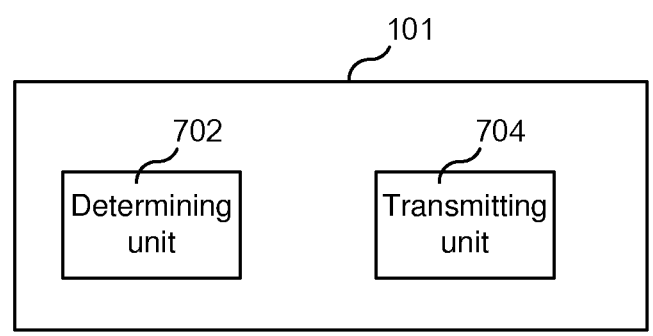
FIG. 7 is a diagram showing functional units of a UE according to one embodiment.

FIG. 7 is a diagram showing functional units of UE 101 according to some embodiments. As shown in FIG. 7, the UE 101 may include: a determining unit 702 for determining that a measurement report should be transmitted, as described above, and a transmitting unit 704 for transmits the measurement report.

Figure 8:
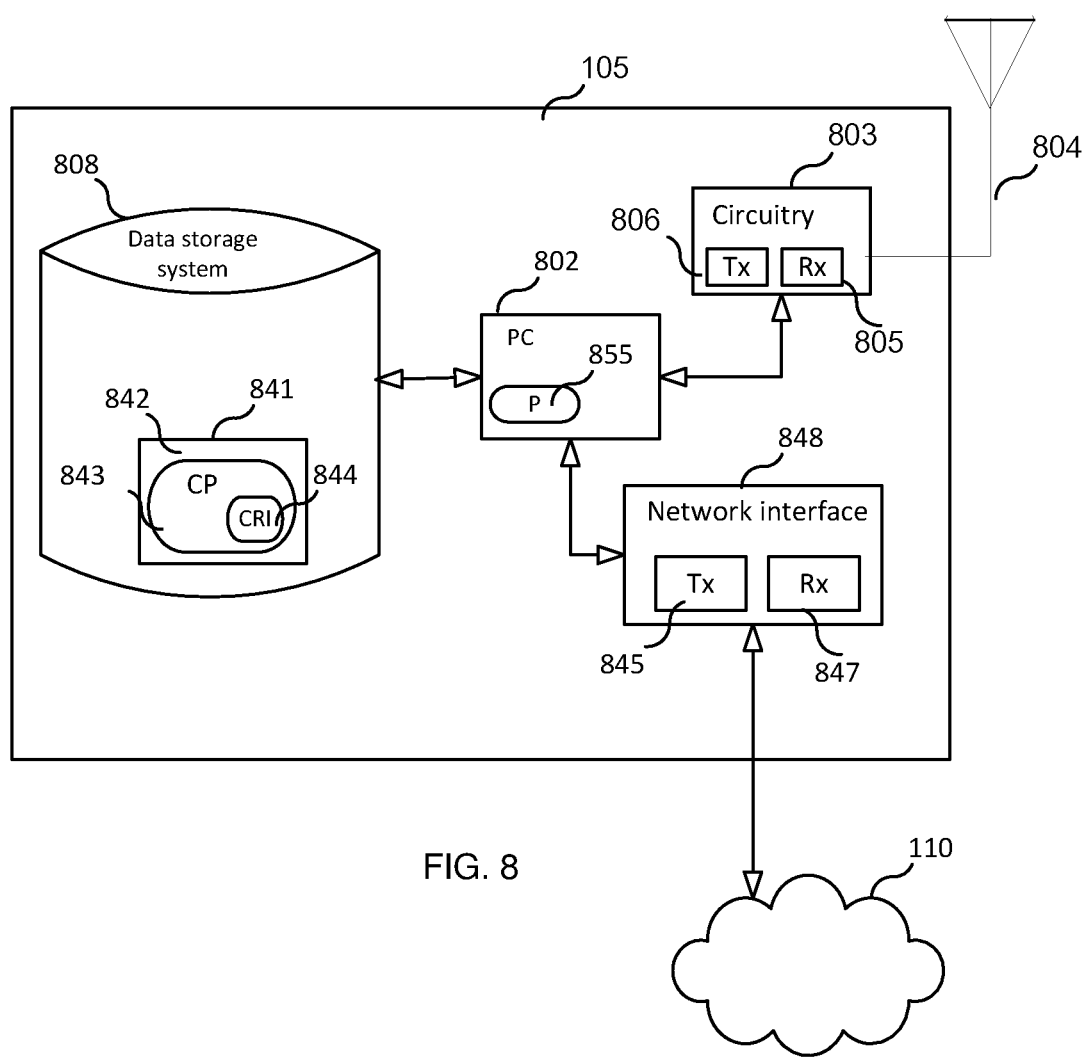
FIG. 8 is a block diagram of a BS according to one embodiment.

FIG. 8 is a block diagram of base station (BS) 105 (e.g., an eNB or gNB) according to some embodiments. As shown in FIG. 8, BS may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like); a network interface 848 comprising a transmitter (Tx) 845 and a receiver (Rx) 847 for enabling the BS to transmit data to and receive data from other nodes connected to a network 110 (e.g., an Internet Protocol (IP) network) to which network interface 848 is connected; circuitry 803 (e.g., radio transceiver circuitry comprising an Rx 805 and a Tx 806) coupled to an antenna system 804 for wireless communication with BSs); and local storage unit (a.k.a., "data storage system") 808, which may include one or more non-volatile storage devices and/or one or more volatile storage devices (e.g., random access memory (RAM)). In embodiments where DPA 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited to, magnetic media (e.g., a hard disk), optical media, memory devices (e.g., random access memory, flash memory), and the like. In some embodiments, the CRI 844 of computer program 843 is configured such that when executed by data processing apparatus 802, the CRI causes BS to perform steps described herein (e.g., steps described herein with reference to the flow charts and/or message flow diagrams). In other embodiments, BS may be configured to perform steps described herein without the need for code. That is, for example, DPA 802 may consist merely of one or more ASICs. Hence, the features of the embodiments described herein may be implemented in hardware and/or software.

Figure 9:
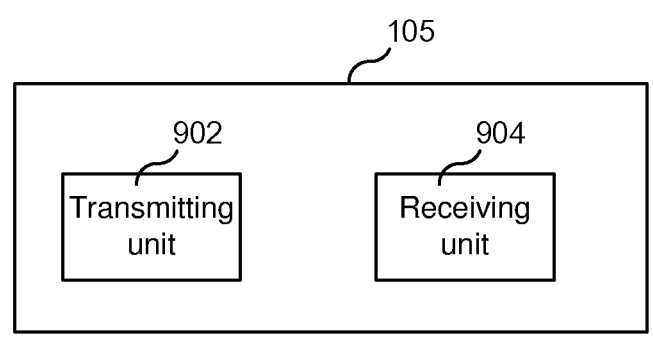
FIG. 9 is a diagram showing functional units of a BS according to one embodiment.

FIG. 9 is a diagram showing functional units of BS 105 according to some embodiments. As shown in FIG. 9, the BS 105 may include: a transmitting unit 902 for transmitting a message comprising a measurement IE that comprises a set of offsets (e.g., a set of frequency specific offsets, a set of cell specific offsets) wherein each offset in the set of offsets is associated with a different altitude; and a receiving unit 904 for receiving a measurement report transmitted by a UE.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A reporting method performed by a user equipment, UE, the method comprising:
   determining that a measurement report should be transmitted;
   as a result of determining that a measurement report should be transmitted, transmitting the measurement report;
   determining that the measurement report should be transmitted comprises determining that a condition associated with a reporting event is satisfied;
   determining that the condition associated with the reporting event is satisfied comprising:
   calculating:

$$X=(Fn+Ofn+Ocn-Hys),$$

Fn being a filtered measurement value, the filtered measurement value based on a measurement of a signal transmitted by a neighbor BS,
   Hys being a hysteresis value,
   Ofn being a frequency specific offset,
   Ocn being a cell specific offset, and
   at least one of Hys, Ofn, and Ocn being dependent on the altitude of the neighbor BS; and
   calculating:

$$Y=(Fp+Ofp+Ocp+Off),$$

Fp being a second filtered measurement value, the second filtered measurement value based on a measurement of a signal transmitted by a serving BS,
   Ofp being dependent on the altitude of the serving BS, and
   Ocp being dependent on the altitude of the serving BS; and
   determining whether the X is greater than the Y.

2. The method of claim 1, further comprising calculating:

$$Fn=(1-a)\times Fn-1+a\times Mn, \text{ where}$$

$$a=\frac{1}{2}^{(k/4)},$$

k is a filter coefficient, wherein k is dependent on at least one of the altitude of the UE and/or the altitude of the serving base station,
   Fn−1 is a previous filtered measurement, and
   Mn is a measurement value.

3. The method of claim 2, further comprising:
   prior to determining that a measurement report should be transmitted, receiving from the serving base station a message comprising a measurement information element (IE), wherein the measurement IE comprises a set of offsets, wherein each offset in the set of offsets is associated with a different altitude.

4. The method of claim 1, further comprising:
   prior to determining that a measurement report should be transmitted, receiving from the serving base station a message comprising a measurement information element (IE), wherein the measurement IE comprises a set of offsets, wherein each offset in the set of offsets is associated with a different altitude.

5. The method of claim 4, wherein the second value is selected from said set of offsets based on a determined altitude of the base station.

6. The method of claim 5, wherein the set of offsets is one of a set of frequency specific offsets and a set of cell specific offsets.

7. The method of claim 4, wherein the set of offsets is one of a set of frequency specific offsets and a set of cell specific offsets.

8. A user equipment, UE, the UE being configured to:
   determine whether a measurement report should be transmitted;
   as a result of determining that a measurement report should be transmitted, employ a transmitter to transmit the measurement report;

determining that the measurement report should be transmitted comprises determining that a condition associated with a reporting event is satisfied;
determining that the condition associated with the reporting event is satisfied comprising:
calculating:

$$X=(Fn+Ofn+Ocn-Hys,$$

Fn being a filtered measurement value, the filtered measurement value based on a measurement of a signal transmitted by a neighbor BS,
Hys being a hysteresis value,
Ofn being a frequency specific offset,
Ocn being a cell specific offset, and
at least one of Hys, Ofn, and Ocn being dependent on the altitude of the neighbor BS; and
calculating:

$$Y=(Fp+Ofp+Ocp+Off),$$

Fp being a second filtered measurement value, the second filtered measurement value based on a measurement of a signal transmitted by a serving BS,
Ofp being dependent on the altitude of the serving BS, and
Ocp being dependent on the altitude of the serving BS; and
determining whether the X is greater than the Y.

9. The method UE of claim 8, wherein the UE is further configured to:
prior to determining that a measurement report should be transmitted, receive from the serving base station a message comprising a measurement information element (IE), wherein the measurement IE comprises a set of offsets, wherein each offset in the set of offsets is associated with a different altitude.

10. A reporting method performed by a base station, BS, the method comprising:
transmitting to a user equipment, UE, a message comprising a measurement information element (IE), the measurement IE comprises a first set of offsets, each offset in the first set of offsets is associated with a different altitude; and
receiving a measurement report transmitted by the UE, the measurement report indicating a condition associated with a reporting event is satisfied and a determination that the condition associated with the reporting event is satisfied comprises:
calculating:

$$X=(Fn+Ofn+Ocn-Hys),$$

Fn being a filtered measurement value, the filtered measurement value based on a measurement of a signal transmitted by a neighbor BS,
Hys being a hysteresis value,
Ofn being a frequency specific offset,
Ocn being a cell specific offset,
at least one of Hys, Ofn, and Ocn being dependent on the altitude of the neighbor BS; and
calculating:

$$Y=(Fp+Ofp+Ocp+Off);$$

Fp being a second filtered measurement value, the second filtered measurement value based on a measurement of a signal transmitted by a serving BS,
Ofp being dependent on the altitude of the serving BS, and
Ocp being dependent on the altitude of the serving BS; and
determining whether the X is greater than the Y.

11. The method of claim 10, wherein the measurement IE further comprises a second set of offsets, wherein each offset in the second set of offsets is associated with a different altitude.

12. A base station, BS, the BS comprising:
a transmitting unit configured to employ a transmitter to transmit to a user equipment, UE, a message comprising a measurement information element (IE), the measurement IE comprising a first set of offsets, each offset in the first set of offsets being associated with a different altitude; and
a receiving unit configured to receive via a receiver a measurement report transmitted by the UE, the measurement report indicating a condition associated with a reporting event is satisfied and a determination that the condition associated with the reporting event is satisfied comprises:
calculating:

$$X=(Fn+Ofn+Ocn-Hys),$$

Fn being a filtered measurement value, the filtered measurement value based on a measurement of a signal transmitted by a neighbor BS,
Hys being a hysteresis value,
Ofn being a frequency specific offset,
Ocn being a cell specific offset,
at least one of Hys, Ofn, and Ocn being dependent on the altitude of the neighbor BS; and
calculating:

$$Y=(Fp+Ofp+Ocp+Off);$$

Fp being a second filtered measurement value, the second filtered measurement value based on a measurement of a signal transmitted by a serving BS,
Ofp being dependent on the altitude of the serving BS, and
Ocp being dependent on the altitude of the serving BS; and
determining whether the X is greater than the Y.

* * * * *